Nov. 15, 1960
M. H. EMRICK
2,960,341
UNIVERSAL LINK DRIVE FOR MULTIPLE CHUCK HEADS
Filed Dec. 4, 1956
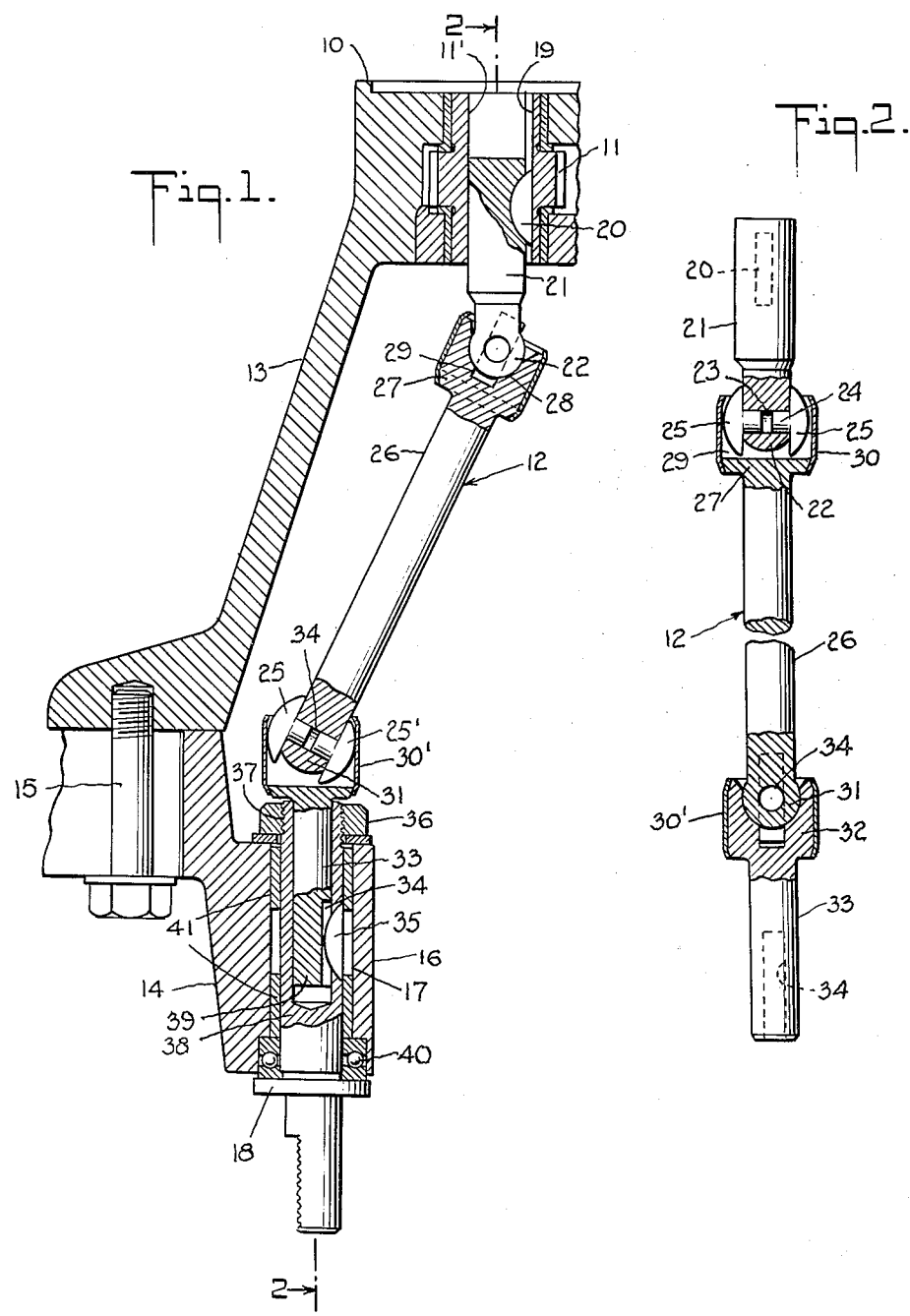
INVENTOR
MELVIN H. EMRICK
BY
ATTORNEY

United States Patent Office 2,960,341
Patented Nov. 15, 1960

2,960,341
UNIVERSAL LINK DRIVE FOR MULTIPLE CHUCK HEADS

Melvin H. Emrick, 264 Mill Spring Road, Manhasset, N.Y.; Dorothea A. Emrick, executrix of the estate of said Melvin H. Emrick, deceased Filed Dec. 4, 1956, Ser. No. 626,259

2 Claims. (Cl. 279—1)

This invention relates to multiple chuck heads for use in operating a plurality of differently positioned drills or taps in simultaneously performing a plurality of drilling or tapping operations on a workpiece. More particularly, the invention deals with a quickly attachable and detachable universal link drive between the drive gears of a multiple head and the differently positioned tool supporting chucks, whereby operations of the type and kind under consideration can be performed utilizing large tools operated at high speeds.

Still more particularly, the invention deals with a universal link drive of the character described, wherein spindles of the linkage can be quickly and easily coupled and uncoupled with the drive gear and the chuck and, further, wherein the linkage is such as to provide a wide range of adjustment of each chuck with respect to the driving gear for the chuck.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view, with parts in elevation showing one of my improved universal drive links and illustrating one chuck and one drive gear and parts of the supports for each; and Fig. 2 is a section on the broken line 2—2 of Fig. 1.

In Fig. 1 of the drawing, I have shown at 10 a small portion of a multiple head and, at 11, one of the drive gears or pinions, with which one of my improved universal link drive units 12 is adapted to be coupled. At 13 is shown part of the supporting frame of the multiple head and upon the lower end of this frame is adjustably supported an arm 14 clamped in adjusted position by a bolt 15, the arm having a long bearing portion 16 in the bore 17, in which is supported the tool chuck supporting spindle 18.

Returning now to the gear or pinion 11, it will be noted that the same has an elongated key groove 19 to adjustably and detachably receive a key 20 mounted in the spindle 21 of the unit 12. The lower end of the spindle 21 has a rounded or ball-like head end 22, with a transverse aperture in opposed sides, as seen at 23, to receive pin ends 24 of rounded joint shoes 25. At 26 is shown the link of the unit 12, the upper end of the link having an enlarged head 27 with a rounded socket 28 therein fitting the rounded head 22 of the spindle 21, as clearly noted in Fig. 1 of the drawing.

The head 27 has a transverse slot 29 therein for reception of the shoes 25. Mounted on the head 27 and the shoes 25 is a coupling sleeve 30 retaining the universal joint formed by the engaging parts 22, 25 and 27 in assembled relationship, as will be apparent.

The lower end of the link 26 has a rounded or ball-like end 31, similar to the end 22, which fits in a head 32 of a lower spindle 33, the head 32 being generally of the same structure as the head 27 and, here again, rounded shoes 25', similar to the shoes 25, are employed and mounted in a transverse aperture 34 of the head 31, as clearly noted in Fig. 1 of the drawing, and, again, a sleeve 30' is employed to retain the joint in assembled relationship, as with the upper structure previously described. These two joints provide, between the two spindles 21 and 33, the desired drive connection and adapts the two spindles to any desired mounting in positioning of the spindle 18 in varied positions of adjustment with respect to the axis of the driving gear 11.

The spindle 33 has an elongated keyway 34 opening through the lower end of the spindle, so as to facilitate quick engagement and disengagement with respect to a key 35 supported in the spindle 18, as noted in Fig. 1 of the drawing. Thus, with the key 20 freely slidable in the key groove 19, it will be apparent that, at any time, the spindles 21 and 33 can be quickly and easily attached and detached with respect to the gear 11 and spindle 18 without disassembling the parts of the appartus as a whole. The long sliding adjustment of the spindle 21 in the bore 11' of the gear 11 also maintains the spindle 21, at all times, in coupling engagement with the gear 11, regardless of the position of adjustment of the spindle 18 with respect thereto.

At this time, it is pointed out that this application deals with drives of multiple chuck heads of the type and kind as disclosed in my prior application, Serial Number 458,085, filed September 24, 1954, now Patent No. 2,790,646, of which this application is a continuation-in-part. In the earlier application, the drive between the drive gear and the chuck is through the medium of a flexible shaft. However, where substantially large tools are mounted in conjunction with a chuck, I have found that a more substantial drive than the flexible shaft is required and a universal drive link unit of the type and kind herein disclosed has proved to perform these operations and, at the same time, I have maintained the quick detachable porperties of the drive link, as well as the readily compensating properties of the drive link in the varied adjustments of the tool supporting spindle.

Considering Fig. 1 of the drawing, it will appear that the spindle 18 is detachably supported in the bearing portion 16 by a nut 36 engaging the upper threaded end 37 of the body portion 38 of the chuck, which body portion has a bore 39 for reception of the spindle 33. A ball thrust bearing 40 is mounted in the lower end of the bearing portion 16 and other bearings 41 are arranged in the bore 17, as noted. This construction provides free rotation of the chuck in the bearing portion 16 of the arm 14.

For purposes of description, the link 26 may be said to have, universally coupled with the ends thereof, coupling pins, comprising the spindles 21 and 33, which pins are readily attachable and detachable with respect to the gear 11 and the tool chuck supporting spindle 18. In other words, the drive unit comprises the link with the coupling pins universally mounted on the end portions of the link and said unit may be termed a universal drive unit.

For purposes of description, the spindle 21 may be termed a male coupling pin, having a head 22 and the spindle 33 may be termed a female coupling pin, having the socket 32. In like manner, the drive unit 12 may be said to have a male head end 31 and a female socket end 27, the head 22 of the pin fitting in the socket 27 and the head end 31 fitting in the socket 32. In this assemblage or coupling, both heads 22, 31 include pairs of joint shoes 25, 25' and coupling sleeves or housings 30, 30'.

Having fully described my invention, what I claim as new and desire to secure by Letters Patent is:

1. A universal drive unit for drive between a drive gear in a fixed support and a tool spindle in a fixed support, the axis of which is spaced and offset with respect to the axis of said first named support, said unit comprising a link and coupling pins at ends of said link, said link comprising a unitary member having a male head end and a female socket end, said male head end including a pair of rounded shoes, one pin being mounted in said drive gear and having a head end, the head end of said pin having a pair of rounded shoes operating in the socket end of said link, the other pin being mounted in said tool spindle and having a socket end receiving the rounded shoes of the head end of said link, and means including coupling sleeves on the socket end of said link and the socket end of said second named pin engaging said shoes for retaining the pins in universal engagement with said link ends.

2. A universal drive unit for drive between a drive gear in a fixed support and a tool spindle in a fixed support, the axis of which is spaced and offset with respect to the axis of said first named support, said unit comprising a link and coupling pins at ends of said link, said link comprising a unitary member having a male head end and a female socket end, said male head end including a pair of rounded shoes, one pin being mounted in said drive gear and having a head end, the head end of said pin having a pair of rounded shoes operating in the socket end of said link, the other pin being mounted in said tool spindle and having a socket end receiving the rounded shoes of the head end of said link, means including coupling sleeves on the socket end of said link and the socket end of said second named pin engaging said shoes for retaining the pins in universal engagement with said link ends, and said second named pin having an elongated keyway in the external surface thereof and opening through the end of said pin facilitating quick coupling and uncoupling with said tool spindle.

References Cited in the file of this patent
UNITED STATES PATENTS

| | | |
|---|---|---|
| 944,228 | Bambridge | Dec. 21, 1909 |
| 954,228 | Timby | Apr. 5, 1910 |
| 1,277,960 | Lindsay | Sept. 3, 1918 |
| 1,368,607 | Cooper | Feb. 15, 1921 |
| 2,153,093 | Magee et al. | Apr. 4, 1939 |
| 2,458,740 | Schafer | Jan. 11, 1949 |
| 2,491,820 | Leibing | Dec. 20, 1949 |
| 2,714,313 | Gerbing | Aug. 2, 1955 |
| 2,790,646 | Emrick | Apr. 30, 1957 |